April 5, 1927.
B. F. BARKER
TYPEWRITING MACHINE
Filed March 14, 1922
1,623,042
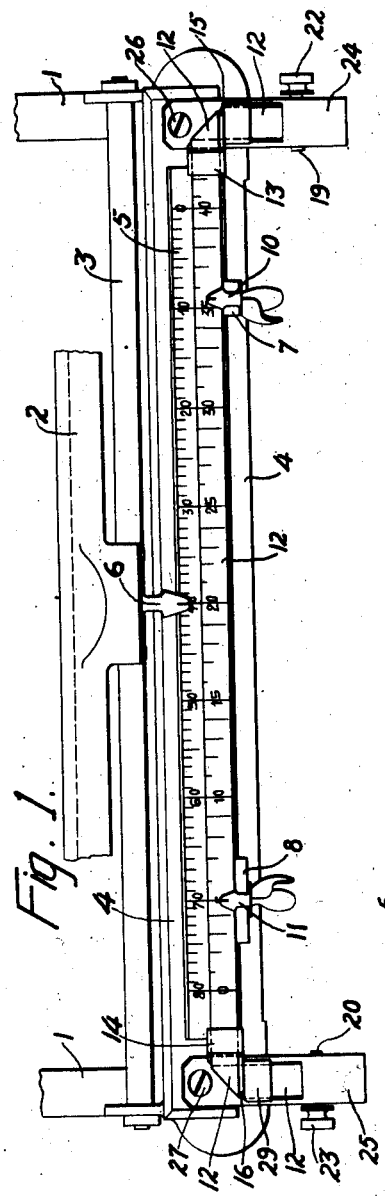
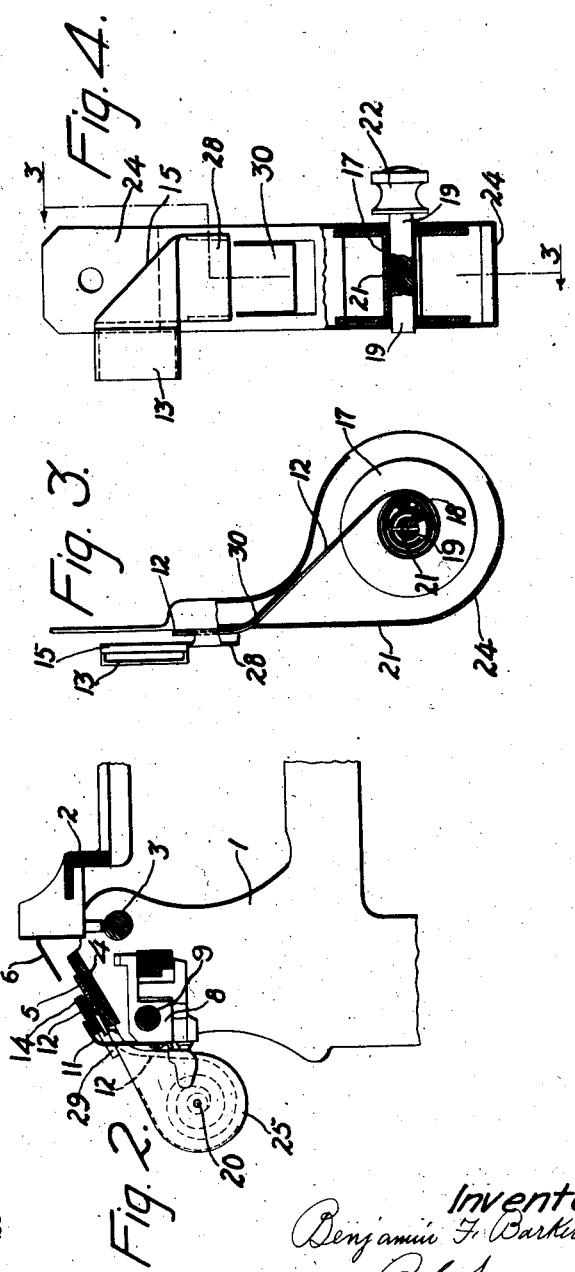
Inventor:
Benjamin F. Barker
by B. C. Stickney
Attorney Patented Apr. 5, 1927.

1,623,042

UNITED STATES PATENT OFFICE.

BENJAMIN F. BARKER, OF EL PASO, TEXAS, ASSIGNOR TO UNDERWOOD TYPEWRITER COMPANY, OF NEW YORK, N. Y., A CORPORATION OF DELAWARE.

TYPEWRITING MACHINE.

Application filed March 14, 1922. Serial No. 543,633.

The invention relates to line-centering equipment for typewriting machines.

The object of the invention is to produce a simple mechanical device readily attachable to the typewriting machine to enable the quick and accurate centering of a line of writing between the side edges of a worksheet.

The invention broadly comprises means to center a line of writing between the two usual adjustable margin-stops. The invention further provides a line-centering scale member having thereon double letter-space indications reversely numbered relatively to the single letter-space scale of the typewriting machine, and mounted upon the typewriting machine to be slidably adjusted along the letter-space scale and relatively to the usual adjustable margin-stops for the carriage. More particularly, the line-centering scale member is in the form of a ribbon or tape extending in a single reach across the single letter-space scale, wound at its ends upon spools journaled in readily attachable and detachable brackets or spool-mounts secured to the opposite sides of the typewriting machine frame, means being provided for rotating the spools to adjust the scale ribbon to different longitudinal positions, which are determined by the adjusted positions of the margin-stops.

It should be understood that the scale on the ribbon should correspond to the letter-space scale if used on a wide-carriage machine, so that the line-centering device may be used in connection with the letter-space scales of any of the standard machines.

Other features and advantages will hereinafter appear.

In the accompanying drawings,

Figure 1 is a plan view of the front part of an Underwood typewriting machine having the present invention applied thereto.

Figure 2 is a central front-to-rear vertical section of the same.

Figure 3 is an enlarged view of the right-hand spool-mount or bracket partly in vertical section on planes indicated by the offset line 3—3 of Figure 4, as viewed from the right.

Figure 4 is a front elevation as viewed from the left in Figure 3, partly in vertical section.

An Underwood typewriting machine, parts of which are shown in the drawings, comprises the usual main frame 1, upon which is mounted to travel for letter-feeding movement the usual platen-carrying carriage 2, which at the front of the machine travels upon the usual front rail 3 extending across the front of the machine frame 1. The usual inclined front bar or plate 4 of the machine frame has fixed thereon the usual letter-space scale 5 of a length to correspond with the extreme limits of travel of the carriage 2 and provided with the usual graduations or letter-space indications, shown as numbered from 0 to 80 from right to left or in the direction of the letter-feeding travel of the carriage, and the carriage 2, at a middle point transversely thereof, is provided with the usual letter-space indicating pointer 6 to co-operate with the letter-space scale 5. The machine also has the usual right and left margin-stops 7 and 8 adjustable by letter-space intervals on the usual rockshaft 9 and provided, respectively, with the usual pointers 10 and 11 to co-operate with the letter-space scale 5.

According to the present invention, a line-centering scale member, shown as in the form of a ribbon 12, extends longitudinally along and above the lower part of the letter-space scale 5, and, for line-centering purposes, is mounted for adjustment along the letter-space scale 5 and relatively to the margin stop pointers 10 and 11. The line-centering scale ribbon 12 is provided with double letter-space indications or graduations numbered from left to right or reversely to the numbering of the letter-space scale 5, and so much of the ribbon as is seen is thus numbered from 0 to 42, and the line-centering scale ribbon 12 has blank end portions or tabs extending beyond the numbered line-centering indications thereon. The end parts of the line-centering scale ribbon 12 at the right and left sides of the machine pass through respective guide-loops 13 and 14 and then make a right angular turn and pass at an inclination forward and downward over diagonal guides 15 and 16 and are wound upon similar spools 17, of which the right-hand one is shown in Figures 3 and 4. The ends or tabs of the line-centering scale ribbon 12 are attached to the respective spools, for example, by means of hooks, of which the right-hand hook 18 is shown in Figure 3, and the spools are fixed upon axles or winding-shafts 19 and 20, for example, by means of pins, of which the pin 21 at the right is shown in Figures 3 and 4. Rotation may be imparted to either the one spool or the other by means of right and left handle-knobs 22 and 23 fixed upon the outer ends of the respective spool axles 19 and 20, to wind the line-centering scale ribbon 12 upon one spool while it unwinds from the other spool, in order thereby to tautly draw the scale ribbon back and forth along the letter-space scale 5. The respective spool axles 19 and 20 are journaled in right and left spool-mounts or brackets 24 and 25, shown as in the form of casings enclosing the spools and having tabs at their upper ends secured to the opposite sides of the machine frame 1 by means of the usual screws 26 and 27 which are ordinarily employed for securing in place the front frame bar or plate 4, upon which is mounted the letter-space scale 5. After leaving the diagonal guide edges 15 and 16, the scale ribbon 12 may pass through additional inclined guide-loops 28 and 29 and then be further guided by means of bent-down tongues 30, of which one is shown in Figures 3 and 4.

The invention provides convenient means for centering between the two adjusted margin-stops 7 and 8 a line of writing shorter than the distance between these stops and regardless of the position to which the stops may be adjusted, and the operation thereof may be substantially as follows: Referring to Figure 1, it will be noted that the right-hand margin-stop 7 is adjusted to the letter-space "9" on the letter-space scale 5, which will determine the extreme point of the beginning of the line of writing at the letter-space "9", while the left-hand margin-stop 8 is shown as adjusted so that its pointer 11 indicates the letter-space "70" on the letter-space scale 5, and in view of the fact that the carriage 2, in the usual construction, will travel four letter-spaces beyond the point at which the left-hand margin-stop is set, the carriage would be stopped at "74" on the letter-space scale 5. For example, suppose it is desired to center the short line "Underwood Typewriter Company" midway between the letter-space scale of indications "9" and "74", then the typist will wind the line-centering scale ribbon 12 on the left-hand spool 17, by rotating the left-hand handle-knob 23, thereby to move or slide the graduated middle part of the line-centering scale ribbon 12 along the letter-space scale 5 from the central or normal position of this ribbon shown in the drawings, until the double line-space indication "9" on the line-centering scale ribbon 12, corresponding to the setting of the right-hand margin-stop 7 for commencement of the line of writing, falls in line with the letter-space indication "74" beyond the pointer 11 of the left-hand margin-stop 8 determinative of the end of the line of writing. Both spools may be rotated alternately for fine and accurate alignment of the indications "9" and "74". Then the typist shifts the carriage 2 to the right until it is stopped by the right-hand margin-stop 7, with the carriage-pointer 6 at the letter-space indication "9" on the letter-space scale 5. Next, the typist taps the space-bar of the machine to count off or spell out the number of letters and spaces in the sentence, which, in the example given, will be twenty-eight letter-spaces. When this is done, she will note that the carriage-pointer 6 has stopped between the line-centering indications "27" and "28" on the line-centering scale 12, and because of the fact that in the particular example selected the carriage-pointer 6 stops between two of the double line-space indications, the typist will give the space-bar one more tap which will bring the carriage-pointer 6 to the line-centering indication "27". The typist now again returns the carriage 2 back toward the right until its pointer 6 stands at the letter-space indication "27" on the letter-space scale 5, at which point the line of writing is to begin. The operation is similar for any point of adjustment of the margin-stops 7 and 8, and for any length of line to be written between these stops.

Variations may be resorted to within the scope of the invention, and portions of the improvements may be used without others.

Having thus described my invention, I claim:

1. A line-centering equipment for a typewriting machine having a traveling carriage and margin-stops to determine normal positions of said carriage for line-commencement and line-ending, including a stationary scale attached to the frame of the machine and having single letter-space gradations numerically indicated in descending order, a double letter-space scale having gradations numerically indicated in ascending order, said double letter-space scale comprising a tape extending in a single reach across said stationary scale, the graduated portion of said tape at least twice the length of the graduated portion of said stationary scale, said tape shiftable from end to end to align any gradation thereon with any gradation of said stationary scale, take-up spools for winding up opposite ends of said tape, brackets on the frame of the machine, said spools mounted on said brackets, and finger-pieces to alternately rotate said spools and draw the scale-bearing portion of said tape tautly back and forth across said single letter-space scale to align a gradation on said tape indicative of normal line-commencement with a single-space gradation on said stationary scale indicative of normal line-ending, said carriage having a pointer to designate the gradation on said tape determining the letter-space for commencing typing of the line to be centered.

2. A universal line-centering equipment for a typewriting machine having a traveling carriage of any width and margin-stops to determine normal positions of said carriage for line-commencement and line-ending, including a stationary scale-bar mounted on the frame of the machine and having single letter-space gradations numerically indicated in descending order, a double letter-space scale having gradations numerically indicated in ascending order, said double letter-space scale comprising a tape extending in a single reach across said stationary scale-bar, said tape having a graduated portion at least twice the length of the graduated portion of said stationary scale-bar and a tab portion at each end of said graduated tape portion, said tape shiftable from end to end of its graduated portion to align any gradation thereon with any gradation of said stationary scale-bar, take-up spools for winding up opposite ends of said tape, said tab portions attached to said spools, brackets on the frame of the machine, said spools mounted on said brackets, finger-pieces to alternately rotate said spools and draw the graduated portion of said tape tautly back and forth across said single letter-space scale to finely align a gradation on said tape indicative of normal line-commencement with a single-space gradation on said stationary scale-bar indicative of normal line-ending, said carriage having a pointer to designate the gradation on said tape determining the letter-space for commencing typing of the line to be centered, and unitary means at each end of said scale-bar to detachably mount said spool-mount brackets and said scale-bar to the frame of the machine.

BENJAMIN F. BARKER.